(12) United States Patent
Nagata et al.

(10) Patent No.: US 8,864,902 B2
(45) Date of Patent: Oct. 21, 2014

(54) CEMENT CLINKER, METHOD OF MANUFACTURING THE SAME AND CEMENT COMPOSITION

(75) Inventors: Hiroshi Nagata, Shunan (JP); Akinori Nakamura, Shunan (JP); Hiroyoshi Kato, Shunan (JP); Takashi Chabayashi, Shunan (JP); Daihachi Kitayama, Shunan (JP)

(73) Assignee: Tokuyama Corporation, Shunan-Shi (JP)

( * ) Notice: Subject to any disclaimer, the term of this patent is extended or adjusted under 35 U.S.C. 154(b) by 0 days.

(21) Appl. No.: 14/003,674

(22) PCT Filed: Apr. 17, 2012

(86) PCT No.: PCT/JP2012/060367
§ 371 (c)(1),
(2), (4) Date: Sep. 6, 2013

(87) PCT Pub. No.: WO2012/144497
PCT Pub. Date: Oct. 26, 2012

(65) Prior Publication Data
US 2013/0340652 A1    Dec. 26, 2013

(30) Foreign Application Priority Data

Apr. 19, 2011 (JP) ................. 2011-093396

(51) Int. Cl.
| | |
|---|---|
| *C04B 7/48* | (2006.01) |
| *C04B 7/44* | (2006.01) |
| *C04B 7/32* | (2006.01) |
| *C04B 11/28* | (2006.01) |
| *C04B 28/00* | (2006.01) |
| *C04B 28/06* | (2006.01) |
| *C04B 14/00* | (2006.01) |
| *C04B 11/00* | (2006.01) |
| *C04B 28/02* | (2006.01) |
| *C04B 7/24* | (2006.01) |
| *C04B 7/02* | (2006.01) |

(52) U.S. Cl.
CPC ................. *C04B 14/00* (2013.01); *C04B 11/00* (2013.01); *C04B 28/02* (2013.01); *C04B 7/24* (2013.01); *C04B 7/02* (2013.01)
USPC ........... 106/693; 106/695; 106/739; 106/772; 106/782; 106/788

(58) Field of Classification Search
CPC ............ C04B 7/02; C04B 7/006; C04B 7/36; C04B 7/38; C04B 7/48; C04B 7/345; C04B 11/00; C04B 11/005; C04B 11/28; C04B 14/06; C04B 14/26; C04B 18/08; C04B 18/141; C04B 22/143; C04B 28/02
USPC .................. 106/739, 772, 782, 788, 693, 695
See application file for complete search history.

(56) References Cited

U.S. PATENT DOCUMENTS 5,356,472 A * 10/1994 Odler ........................... 106/734
6,419,741 B1    7/2002 Ikabata et al.

FOREIGN PATENT DOCUMENTS

| | | | | |
|---|---|---|---|---|
| JP | 10-330135 A | 12/1998 | | |
| JP | 2004-352515 A | 12/2004 | | |
| JP | 2007-137722 A * | 6/2007 | ................ | C04B 7/13 |
| JP | 4775495 B1 * | 7/2011 | .............. | C04B 7/345 |
| JP | 2012-91992 A | 5/2012 | | |
| SU | 1498731 A * | 8/1989 | ................ | C04B 7/00 |

OTHER PUBLICATIONS

Tokyay, "Effect of chemical composition of clinker on grinding energy requirement", Cement and Concrete Research 29 (1999) pp. 531-535.*
International Search Report issued in PCT/JP2012/060367 mailed Jul. 24, 2012.
Japan Concrete Institute, Concrete Binran, 2nd edition, Gihodo Shuppan Co., Ltd., Feb. 15, 1996, p. 33.

* cited by examiner

*Primary Examiner* — Anthony J Green
(74) *Attorney, Agent, or Firm* — Birch, Stewart, Kolasch & Birch, LLP

(57) ABSTRACT

A cement clinker which can be sintered at 1,300 to 1,400° C. which is lower than the conventional sintering temperature and develops excellent strength characteristics such as mortar compression strength.

The cement clinker has a total content of $C_3A$ and $C_4AF$ calculated by Bogue's formulas of 22 mass % or more, a $C_3S$ content calculated by Bogue's formula of 60 mass % or more and an iron modulus (I.M.) of 1.3 or less, preferably 1.0 to 1.3. Since the total content of $C_3A$ and $C_4AF$ is 22 mass % or more, the cement clinker can be sintered at a low temperature and the reduction of strength when a cement composition is cured can be prevented by reducing the iron modulus of the cement clinker.

8 Claims, No Drawings

US 8,864,902 B2

CEMENT CLINKER, METHOD OF MANUFACTURING THE SAME AND CEMENT COMPOSITION

TECHNICAL FIELD

The present invention relates to a cement clinker, a method of manufacturing the same and a cement composition. More specifically, it relates to a cement clinker having novel composition which exhibits excellent physical properties even when it is sintered at a lower temperature than the conventional temperature and a cement composition comprising the clinker.

BACKGROUND ART

The cement industry is a mass-production/mass-consumption type industry for which it is assumed that resource saving and energy saving have been and will be the most important issues. For example, to manufacture Portland cement which is now manufactured in largest quantity, raw materials which have been prepared to achieve predetermined chemical composition must be sintered at a high temperature of 1,450 to 1,550° C. to produce a clinker, and energy costs for obtaining this temperature are huge.

Meanwhile, effective use of waste products and by-products is now an important issue in connection with a recent global environmental problem. Making use of the characteristic features of the cement industry and the cement production equipment in order to make effective use of or dispose of waste products as raw materials or fuel for the manufacture of cement is considered as effective because large amounts of waste products can be disposed of safely (Patent Document 1).

PRIOR ART DOCUMENTS

Patent Documents

Patent Document 1: JP-A 2004-352515

DISCLOSURE OF THE INVENTION

Problem to be Solved by the Invention

Out of the waste products and the by-products, municipal waste incinerated ash, granulated blast furnace slag and annealed blast furnace slag, especially coal ash and the like have a higher content of aluminum oxide ($Al_2O_3$) than that of an ordinary cement clinker. When the amounts of waste products and by-products having a high content of $Al_2O_3$ to be used are increased, the content of $C_3A$ out of minerals constituting a cement clinker grows. This $C_3A$ is called "interstitial phase" like $C_4AF$, and when the content of $C_3A$ increases, the sintering temperature of the clinker can be reduced. On the other hand, it exerts an influence on production of other minerals ($C_3S$, $C_2S$) constituting a clinker and important for the strength of cement, thereby affecting the physical properties of cement.

Then, the present invention is aimed to provide a cement clinker having novel composition, which can increase the total amount of waste products as compared with conventional cement, can reduce the sintering temperature at the time of manufacture without using a mineralizer such as calcium fluoride and has excellent strength developing properties like a conventional cement clinker.

Means for Solving the Problem

The inventors of the present invention conducted intensive studies to solve the above problem and found that when the iron modulus (I.M.) of a clinker is set to a predetermined value or less, if the clinker has high contents of $C_3A$ and $C_4AF$, it develops high strength. The inventors conducted further studies to accomplish the present invention.

That is, according to the present invention, there is provided a cement clinker which has a total content of tricalcium aluminate ($C_3A$) and tetracalcium aluminoferrite ($C_4AF$) calculated by Bogue's formulas of 22 mass % or more, a tricalcium silicate ($C_3S$) content calculated by Bogue's formula of 60 mass % or more and an iron modulus (I.M.) of 1.3 or less.

In the invention of the above cement clinker, it is preferred that
1) the content of $C_4AF$ should be 15 mass % or more and
2) the total content of $C_3S$ and dicalcium silicate ($C_2S$) should be 69 mass % or more.

According to the present invention, there is also provided a cement composition comprising the above cement clinker and gypsum. Preferably, the cement composition further comprises at least one admixture selected from blast furnace slag, siliceous admixture, fly ash and limestone.

According to the present invention, there is further provided a method of manufacturing a cement clinker, comprising the steps of:
preparing raw materials to achieve a total content of $C_3A$ and $C_4AF$ calculated by Rogue's formulas of 22 mass % or more, a $C_3S$ content calculated by Bogue's formula of 60 mass % or more and an iron modulus (I.M.) of 1.3 or less; and
sintering the raw materials at 1,300 to 1,400° C.

Effect of the Invention

According to the present invention, the total amount of waste products to be used as raw materials can be increased more than that for a conventional cement clinker, and the sintering temperature can be reduced to 1,300 to 1,400° C. Further, as compared with a conventionally known cement clinker which is sintered at a high temperature, the same strength developing properties are obtained.

BEST MODE FOR CARRYING OUT THE INVENTION

The contents of $C_3A$, $C_4AF$ and $C_3S$ in the present invention are values which are calculated by the Bogue's formulas and show the composition (contents) of principal minerals to be used as managerial feature values in the product management and production process of a clinker like modulus which will be described hereinafter.

The Bogue's formulas are used to calculate the composition of principal minerals approximately by using the contents (unit: mass %) of main chemical components. They are well-known formulas for people having ordinary skill in the art. How to obtain the content of each mineral in the clinker by using the Bogue's formula is shown below. The unit is mass % in all the formulas.

Content of $C_3S=(4.07\times CaO)-(7.60\times SiO_2)-(6.72\times Al_2O_3)-(1.43\times Fe_2O_3)$ Content of $C_2S=(2.87\times SiO_2)-(0.754\times C_3S)$ Content of $C_3A=(2.65\times Al_2O_3)-(1.69\times Fe_2O_3)$ Content of $C_3AF=3.04\times Fe_2O_3$ The iron modulus (I.M.) is one of modulus such as hydraulic modulus (H.M.), silica modulus (S.M.), activity index (A.I.) and lime saturation degree (L.S.D.). These modulus are characteristic values used to produce and manage clinkers and obtained by using the contents of main chemical components like the composition of minerals obtained by the above Bogue's formulas. The iron modulus and its calculation method are well known to people having ordinary skill in the art and given below together with methods of calculating other modulus.

hydraulic modulus (H.M.)=$CaO/(SiO_2+Al_2O_3+Fe_2O_3)$

Silica modulus (S.M.)=$SiO_2/(Al_2O_3+Fe_2O_3)$

Activity index (A.I.)=$SiO_2/Al_2O_3$

Iron modulus (I.M.)=$Al_2O_3/Fe_2O_3$

Lime saturation degree (L.S.D.)=$CaO/(2.8 \times SiO_2 + 1.18 \times Al_2O_3 + 0.65 \times Fe_2O_3)$ "CaO", "$SiO_2$", "$Al_2O_3$" and "$Fe_2O_3$" in the above formulas are the contents (mass %) of these chemical components obtained by methods based on JI R5202 "Chemical Analysis Method of Portland Cement" and JI R5204 "Fluorescent X-ray Analysis Method of Cement".

The cement clinker of the present invention comprises CaO, $SiO_2$, $Al_2O_3$ and $Fe_2O_3$ as main chemical components and trace amounts of oxides such as MgO, NaO and $K_2O$ as other components. The cement clinker is characterized by the composition of minerals calculated by the following Bogue's formulas and iron modulus (I.M.).

The cement clinker of the present invention must have a total content of $C_3A$ and $C_4AF$ of 22 mass % or more. When the total content of $C_3A$ and $C_4AF$ is lower than 22 mass %, it is difficult to obtain a cement clinker having satisfactory physical properties such as strength developing properties by sintering at 1,300 to 1,400° C. which is lower than the conventional sintering temperature. The total content of $C_3A$ and $C_4AF$ is more preferably 24 mass % or more.

As will be described hereinafter, to obtain high strength developing properties, the content of $C_3S$ must be 60 mass % or more. Therefore, the upper limit of the total content of $C_3A$ and $C_4AF$ is 40 mass %. It is preferably 35 mass % or less, more preferably 32 mass % or less and particularly preferably 28 mass % or less.

Out of these components, the content of $C_4AF$ alone is preferably 15 mass % or more as it can be completely sintered at a low temperature and can reduce the content of free calcium oxide (f-CaO) in the cement clinker.

The content of $C_3S$ is extremely important for the strength developing properties of the cement composition comprising the cement clinker of the present invention (to be simply referred to as "cement" hereinafter). When this content is lower than 60 mass %, if the total content of $C_3A$ and $C_4AF$ and the iron modulus which will be described hereinafter are set to predetermined ranges, satisfactory strength developing properties are not obtained. The content of $C_3S$ is preferably 62 mass % or more and particularly preferably 63 mass % or more. Since the total content of $C_3A$ and $C_4AF$ is at least 22 mass %, the upper limit of the content of $C_3S$ is 78 mass %. To ensure a time from the initial set to the final set (may also be referred to as "setting time" hereinafter), the above upper limit value is preferably 70 mass % or less and more preferably 65 mass % or less.

The cement clinker of the present invention may further comprise $C_2S$. The content of $C_2S$ is preferably 3 to 18 mass %. To obtain long-term strength, the total content of $C_2S$ and $C_3S$ is particular preferably 69 mass % or more.

It is the most important that the iron modulus (I.M.) of the cement clinker of the present invention should be 1.3 or less. When the iron modulus is more than 1.3, if the other requirements for the cement clinker of the present invention are satisfied, satisfactory strength developing properties (more specifically, for example, the mortar strength developing properties) cannot be obtained. When the iron modulus is more than 1.3, the setting time tends to become too long. From this point of view, the iron modulus must be 1.3 or less. It is preferably 1.0 to 1.3 and particularly preferably 1.14 to 1.27.

Although the hydraulic modulus and the silica modulus are not particularly limited, to obtain good balance among physical properties, the hydraulic modulus is preferably 1.8 to 2.2 and particularly preferably 1.9 to 2.1, and the silicate modulus is preferably 1.0 to 2.0 and particularly preferably 1.1 to 1.7.

The method of manufacturing the cement clinker of the present invention is not particularly limited. The cement clinker of the present invention can be manufactured by preparing and mixing together known cement raw materials in a predetermined ratio to achieve the above composition of minerals and the above modulus specified by the present invention and sintering the resulting mixture by known means such as a suspension preheater system or a new suspension preheater system.

A known method of preparing and mixing together the cement raw materials may be adopted. For example, the chemical components of waste products, by-products and other raw materials (CaO sources such as limestone, quicklime and slaked lime, $SiO_2$ sources such as silica stone, $Al_2O_3$ sources such as clay and coal ash, and $Fe_2O_3$ sources such as copper slag and blast furnace slag) are analyzed in advance, the preparation ratio of the raw materials is calculated from the contents of the components in these raw materials so that the above requirements specified by the present invention are satisfied, and the raw materials are mixed together in the calculated ratio. The same raw materials as the raw materials used for the manufacture of a conventional cement clinker may be used in the manufacturing method of the present invention without restriction. As a matter of course, it is possible to use waste products and by-products.

In the manufacturing method of the present invention, use of at least one type of waste from waste products and by-products is preferred from the viewpoint of promoting effective use of waste products and by-products.

Specific examples of the waste products and by-products which can be used herein include blast furnace slag, steel slag, non-iron steel junk, coal ash, sewage sludge, waterworks sludge, paper sludge, soil produced by construction, casting sand, soot and dust, incinerated fly ash, molten fly ash, chlorine by-path dust, wood waste, waste white clay, copper slag, waste tires, sea shells, municipal waste and incinerated ash thereof. Some of them become cement raw materials and heat energy sources.

Particularly the cement clinker of the present invention contains a lot of minerals containing aluminum such as $C_3A$ and $C_4AF$ as constituent elements. Therefore, the cement clinker of the present invention has an advantage that it can be manufactured by using larger amounts of aluminum-rich waste products and by-products than those of a conventional cement clinker.

The cement clinker manufactured by the method of the present invention is ground together with gypsum or ground independently and mixed with gypsum to produce cement like a conventionally known cement clinker. Examples of the cement include ordinary Portland cement, early-strength Portland cement and super early-strength Portland cement. The cement clinker may also be used as a constituent component of mixed cement or a constituent component of a fixation material such as a soil fixation material, besides Portland cement.

When cement is prepared by adding gypsum, known gypsum such as dihydrate gypsum, hemihydrate gypsum or anhydrous gypsum may be used as a raw material for manufacturing cement without restriction. As the amount of gypsum, gypsum is added to ensure that the content of $SO_3$ in the gypsum is preferably 1.5 to 5.0 mass % and more preferably 1.8 to 3 mass % in the case of Portland cement. As for the method of pulverizing the above cement clinker and gypsum, any known technique may be used without restriction.

An admixture such as blast furnace slag, siliceous admixture, fly ash, calcium carbonate or limestone, or a grinding aid is added to and mixed with the above cement and then the resulting mixture is ground, or the above cement is ground and then mixed with the admixture or the grinding aid. It may also be mixed with chlorine by-path dust.

Further, it is possible to mix blast furnace slag and fly ash with the cement as required after grinding so as to manufacture blast furnace slag cement and fly ash cement, respectively.

The degree of fineness of the cement is not particularly limited but preferably 2,800 to 4,500 cm$^2$/g in terms of blaine specific surface area.

EXAMPLES

The following examples are provided for the purpose of further illustrating the present invention but are in no way to be taken as limiting. Not all the combinations of characteristic features described in Examples are always essential to the means of solving the problem of the present invention.

Example 1

75.98 parts by mass of limestone as a CaO source, 4.41 parts by mass of silica stone as a $SiO_2$ source, 14.75 parts by mass of coal ash as an $Al_2O_3$ source and 4.85 parts by mass of copper slag as a $Fe_2O_3$ source were mixed together and the resulting mixture was sintered at 1,350° C. for 90 minutes to obtain a cement clinker. The chemical composition, mineral contents calculated by Bogue's formulas and modulus (hydraulic modulus (H.M.), silica modulus (S.M.) and iron modulus (I.M.)) of the obtained cement clinker are shown in Table 1. Gypsum was added to this cement clinker in an amount of 2±0.2% in terms of $SO_3$, and the resulting mixture was mixed and ground to a specific surface area measured by the Blaine method of 3,200±50 cm$^2$/g so as to produce cement.

The above cement was measured for its mortar compressive strength and setting time by the following methods. The results are shown in Table 2.

[Measurement Methods]
(1) Measurement of the chemical compositions of raw materials and cement clinker: analyzed by a JIS R 5204-based fluorescent X-ray analysis method
(2) Measurement of mortar compression strength: measured by a JIS R 5201-based method
(3) Setting time: measured by a JIS R 5201-based method Examples 2 to 12, Comparative Examples 1 to 8

Cement clinkers and cements were manufactured in the same manner as in Example 1 except that the amounts of raw materials and the sintering temperature were changed. The composition of minerals calculated by the Bogue's formulas and others of each of the obtained cement clinkers are shown in Table 1, and the physical properties of the cements are shown in Table 2.

In Tables 1 and 2, a cement clinker having standard composition which has been existent conventionally and sintered at a standard temperature is shown as a reference example. The results of Examples and Comparative Examples are discussed based on the reference example as a standard.

TABLE 1

| | * | Chemical composition of clinker (%) | | | | | | Mineral contents calculated by Bogue's formulas (%) | | | | $C_3A +$ | Modulus | | |
|---|---|---|---|---|---|---|---|---|---|---|---|---|---|---|---|
| | | CaO | SiO$_2$ | Al$_2$O$_3$ | Fe$_2$O$_3$ | MgO | TiO$_2$ | C$_3$S | C$_2$S | C$_3$A | C$_4$AF | C$_4$AF | H.M. | S.M. | I.M. |
| Ref. Ex. | 1450 | 67.01 | 21.76 | 5.73 | 3.16 | 0.92 | 0.3 | 64 | 14 | 9.8 | 9.6 | 19.4 | 2.19 | 2.45 | 1.81 |
| Ex. 1 | 1350 | 64.82 | 18.90 | 7.11 | 6.25 | 1.09 | 0.43 | 63 | 7 | 8.3 | 19.0 | 27.3 | 2.01 | 1.41 | 1.14 |
| Ex. 2 | 1350 | 65.46 | 19.87 | 6.53 | 5.40 | 1.05 | 0.39 | 64 | 9 | 8.2 | 16.4 | 24.6 | 2.06 | 1.67 | 1.21 |
| Ex. 3 | 1350 | 66.02 | 19.40 | 6.48 | 5.36 | 1.05 | 0.38 | 70 | 3 | 8.1 | 16.3 | 24.4 | 2.11 | 1.64 | 1.21 |
| Ex. 4 | 1350 | 65.50 | 19.36 | 7.06 | 5.31 | 0.99 | 0.42 | 64 | 7 | 9.7 | 16.1 | 25.8 | 2.06 | 1.57 | 1.33 |
| Ex. 5 | 1350 | 64.88 | 18.64 | 7.53 | 5.94 | 1.09 | 0.44 | 63 | 6 | 9.9 | 18.1 | 28 | 2.02 | 1.38 | 1.27 |
| Ex. 6 | 1350 | 64.78 | 18.24 | 7.72 | 6.30 | 1.03 | 0.46 | 64 | 4 | 9.8 | 19.2 | 29 | 2.01 | 1.30 | 1.23 |
| Ex. 7 | 1350 | 64.34 | 17.97 | 7.92 | 6.62 | 1.12 | 0.47 | 63 | 4 | 9.8 | 20.1 | 29.9 | 1.98 | 1.24 | 1.20 |
| Ex. 8 | 1350 | 63.89 | 17.39 | 8.28 | 7.19 | 1.14 | 0.5 | 62 | 3 | 9.8 | 21.9 | 31.7 | 1.94 | 1.12 | 1.15 |
| Ex. 9 | 1350 | 66.22 | 20.08 | 5.63 | 5.14 | 0.98 | 1.0 | 72 | 4 | 6.2 | 15.6 | 21.8 | 2.15 | 1.86 | 1.10 |
| Ex. 10 | 1350 | 65.95 | 19.81 | 5.83 | 5.43 | 1.00 | 1.0 | 71 | 3 | 6.3 | 16.5 | 22.8 | 2.12 | 1.76 | 1.08 |
| Ex. 11 | 1350 | 65.33 | 18.88 | 7.32 | 5.46 | 1.01 | 1.0 | 65 | 5 | 10.2 | 16.6 | 26.8 | 2.06 | 1.48 | 1.34 |
| Ex. 12 | 1350 | 65.53 | 20.70 | 5.60 | 5.11 | 1.00 | 1.0 | 64 | 11 | 6.2 | 15.5 | 21.7 | 2.09 | 1.93 | 1.10 |
| Comp. Ex. 1 | 1350 | 66.84 | 21.69 | 5.79 | 3.18 | 0.92 | 0.34 | 64 | 14 | 10.0 | 9.7 | 19.7 | 2.18 | 2.42 | 1.82 |
| Comp. Ex. 2 | 1350 | 66.09 | 20.64 | 6.43 | 4.16 | 0.96 | 0.36 | 63 | 12 | 10.0 | 12.6 | 22.6 | 2.12 | 1.95 | 1.55 |
| Comp. Ex. 3 | 1350 | 65.68 | 19.89 | 6.87 | 4.82 | 0.99 | 0.39 | 63 | 10 | 10.1 | 14.7 | 24.8 | 2.08 | 1.70 | 1.43 |
| Comp. Ex. 4 | 1350 | 66.34 | 21.71 | 5.28 | 4.13 | 0.98 | 0.3 | 64 | 14 | 7.0 | 12.6 | 19.6 | 2.13 | 2.31 | 1.28 |
| Comp. Ex. 5 | 1350 | 66.22 | 21.74 | 5.21 | 4.13 | 0.98 | 0.3 | 63 | 15 | 6.6 | 13.0 | 19.6 | 2.12 | 2.29 | 1.22 |
| Comp. Ex. 6 | 1350 | 66.11 | 21.75 | 5.03 | 4.57 | 0.97 | 0.29 | 63 | 15 | 5.6 | 13.9 | 19.5 | 2.11 | 2.27 | 1.10 |
| Comp. Ex. 7 | 1350 | 64.29 | 20.88 | 6.57 | 5.44 | 1.05 | 0.39 | 51 | 21 | 8.2 | 16.5 | 24.7 | 1.96 | 1.74 | 1.21 |
| Comp. Ex. 8 | 1400 | 63.56 | 23.1 | 7.07 | 3.52 | 0.99 | 0.3 | 31 | 43 | 12.8 | 10.7 | 23.5 | 1.89 | 2.18 | 2.01 |

* Sintering temperature (° C.)

TABLE 2

| | Mortar compressive strength N/mm² | | | Setting time from initial to final (minutes) |
|---|---|---|---|---|
| | One day | Three days | Seven days | |
| Ref. Ex. | 9.3 | 23.1 | 37.0 | 65 |
| Ex. 1 | 10.2 | 25.9 | 40.9 | 55 |
| Ex. 2 | 9.4 | 25.6 | 40.7 | 40 |
| Ex. 3 | 11.3 | 27.9 | 41.2 | 25 |
| Ex. 4 | 9.9 | 24.0 | 38.3 | 65 |
| Ex. 5 | 8.7 | 25.4 | 40.6 | 35 |
| Ex. 6 | 10.0 | 25.5 | 38.9 | 60 |
| Ex. 7 | 8.1 | 24.3 | 39.4 | 40 |
| Ex. 8 | 8.2 | 24.4 | 39.5 | 45 |
| Ex. 9 | 12.4 | 28.5 | 41.0 | 60 |
| Ex. 10 | 12.1 | 28.5 | 41.8 | 70 |
| Ex. 11 | 9.5 | 24.5 | 38.1 | 55 |
| Ex. 12 | 10.4 | 24.3 | 37.7 | 65 |
| Comp. Ex. 1 | 7.4 | 18.1 | 29.5 | 65 |
| Comp. Ex. 2 | 8.3 | 20.9 | 33.7 | 75 |
| Comp. Ex. 3 | 7.9 | 23.0 | 36.3 | 80 |
| Comp. Ex. 4 | 8.9 | 22.4 | 35.8 | 45 |
| Comp. Ex. 5 | 9.1 | 22.8 | 36.6 | 60 |
| Comp. Ex. 6 | 9.5 | 22.7 | 35.7 | 50 |
| Comp. Ex. 7 | 7.0 | 19.1 | 31.0 | 55 |
| Comp. Ex. 8 | 3.9 | 7.9 | 14.1 | 125 |

Examples 1 to 12 relate to the present invention in which the raw materials were sintered at 1,350° C. which is 100° C. lower than that of the clinker of the reference example. In these examples, mortar compressive strength at 7 days is higher than that of the reference example.

Comparative Example 1 is an example in which the raw materials having the same composition as that of Reference Example 1 was sintered at 1,350° C. As shown in Table 2, it is understood that a conventional cement clinker having standard composition rarely develop sufficiently high mortar strength at 7 days when the sintering temperature is lowered.

In Comparative Examples 2 and 3, the iron modulus (I.M.) is 1.4 or more. As shown in Table 2, sufficiently high mortar strength is rarely developed up to 7 days. It is also understood that the setting time from the initial set to the final set is longer than that of Reference Example.

In Comparative Examples 4 to 6, the total content of $C_3A$ and $C_4AF$ is lower than 22 mass %. Also in this case, sufficiently high mortar strength is rarely developed up to 7 days.

In Comparative Example 7, the content of $C_3S$ is 51 mass % which is lower than 60 mass % specified by the present invention. Also in this case, sufficiently high mortar strength is rarely developed up to 7 days.

In Comparative Example 8, although the total content of $C_3A$ and $C_4AF$ is 22 mass % or more, I.M. exceeds 1.3 and the content of $C_3S$ is low at 31 mass %. Even when the sintering temperature is set to 1,400° C. which is 50° C. higher than those of other examples and comparative examples, sufficiently high mortar strength is rarely developed up to 7 days.

The invention claimed is:

1. A method of manufacturing a cement clinker, comprising the steps of:
preparing raw materials to achieve, when sintered at 1,350° C. for 90 minutes, a total content of tricalcium aluminate ($3CaO.Al_2O_3$) and tetracalcium aluminoferrite ($4CaO.Al_2O_3.Fe_2O_3$) calculated by Bogue's formulas of 22 mass % or more and a tricalcium silicate ($3CaO.SiO_2$) content calculated by Bogue's formula of 60 mass % or more and an iron modulus (I.M.) of 1.3 or less; and
sintering the raw materials at 1,300 to 1,400° C.

2. The method of manufacturing a cement clinker according to claim 1, wherein a material is prepared to have a content of tetracalcium aluminoferrite content of 15 mass % or more.

3. The method of manufacturing a cement clinker according to claim 1, wherein a material is prepared to have a total content of tricalcium silicate and dicalcium silicate ($2CaO.SiO_2$) of 69 mass % or more.

4. The method of manufacturing a cement clinker according to claim 2, wherein a material is prepared to have a total content of tricalcium silicate and dicalcium silicate ($2CaO.SiO_2$) of 69 mass % or more.

5. A method of manufacturing a cement, comprising:
manufacturing a cement clinker by the method of manufacturing a cement clinker according to claim 1, and
subsequently, mixing a gypsum with the cement clinker to obtain the cement.

6. A method of manufacturing a cement, comprising:
manufacturing a cement clinker by the method of manufacturing a cement clinker according to claim 2, and
subsequently, a gypsum is mixed with the cement clinker to obtain the cement.

7. A method of manufacturing a cement, comprising:
manufacturing a cement clinker by the method of manufacturing a cement clinker according to claim 3, and
subsequently, a gypsum is mixed with the cement clinker to obtain the cement.

8. A method of manufacturing a cement, comprising:
manufacturing a cement clinker by the method of manufacturing a cement clinker according to claim 4, and
subsequently, a gypsum is mixed with the cement clinker to obtain the cement.

* * * * *